United States Patent
Spriggs et al.

(10) Patent No.: US 6,300,429 B1
(45) Date of Patent: Oct. 9, 2001

(54) METHOD OF MODIFYING NEAR-WALL TEMPERATURE IN A GAS PHASE POLYMERIZATION REACTOR

(75) Inventors: Thomas Edward Spriggs, Cross Lanes, WV (US); James Laurence Riley, Jr., Luling, LA (US); James Daniel Madden; George William Schwarz, Jr., both of Charleston, WV (US); Mark Gregory Goode, Hurricane, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/224,181

(22) Filed: Dec. 31, 1998

(51) Int. Cl.[7] ........................................ C08F 2/00
(52) U.S. Cl. ......................... 526/62; 526/88; 526/70; 526/68; 526/59; 526/74; 526/78; 526/901
(58) Field of Search ................... 526/88, 70, 68, 526/59, 62, 74, 78, 901

(56) References Cited

U.S. PATENT DOCUMENTS

| | | | |
|---|---|---|---|
| 3,254,070 | 5/1966 | Roelen | 260/94.9 |
| 4,255,542 | 3/1981 | Brown et al. | 526/88 |
| 4,402,914 * | 9/1983 | Eckhoff | 422/132 |
| 4,424,198 | 1/1984 | Ito et al. | 423/342 |
| 4,543,399 | 9/1985 | Jenkins, III et al. | 526/70 |
| 4,588,790 | 5/1986 | Jenkins, III et al. | 526/70 |
| 4,803,251 | 2/1989 | Goode et al. | 526/59 |
| 4,855,370 | 8/1989 | Chirillo et al. | 526/74 |
| 4,944,150 | 7/1990 | Ostman | 60/39.182 |
| 4,981,929 | 1/1991 | Hussein et al. | 526/125 |
| 5,025,755 | 6/1991 | Eickvonder et al. | 122/4 D |

FOREIGN PATENT DOCUMENTS

| | | |
|---|---|---|
| 709470 | 5/1965 | (CA) . |
| 7062009 * | 3/1995 | (JP) . |
| 762009 | 3/1995 | (JP) . |
| 9249703 * | 9/1997 | (JP) . |
| 09302008 | 11/1997 | (JP) . |

* cited by examiner

Primary Examiner—David W. Wu
Assistant Examiner—Ling-Siu Choi

(57) ABSTRACT

A falling film of water is applied around the periphery of a fluid bed olefin polymerization reactor to cool the wall and reduce the temperature in the fluid bed near the inside surface of the wall. Cooling has the effect of reducing static in the reactor, which in turn ameliorates a sheeting problem and can enhance production by facilitating control of the relation of the reactor temperature and the dew point of recycled gas. The process may be used concurrently with a gas cooling and condensing recycle system wherein at least some of the condensed recycle gas is injected in the vicinity of the internal wall surface.

32 Claims, 3 Drawing Sheets

METHOD OF MODIFYING NEAR-WALL TEMPERATURE IN A GAS PHASE POLYMERIZATION REACTOR

TECHNICAL FIELD

This invention relates to the gas phase, fluidized bed polymerization of olefins and other polymerizable monomers. It is a method of reducing the temperature near the inner wall of a gas phase polymerization reactor through the application of water to the outside of the reactor.

BACKGROUND OF THE INVENTION

The gas phase fluidized bed reactors for which this invention is most useful are those such as described in US Patents to Noshay et al U.S. Pat. No. 4,482,687, Goode et al U.S. Pat. No. 4,803,251, Chirillo et al U.S. Pat. No. 4,855,370, Painter et al U.S. Pat. No. 5,428,118, and Chinh et al U.S. Pat. No. 5,733,510. These and other reactors to which our invention is applicable are characterized by a straight cylindrical section topped by a bulbous expanded section and are widely used for polymerizing α-olefins such as ethylene, propylene and others having up to about eight carbon atoms. They are large reactors having relatively thick steel walls, i.e. about two inches to about four inches thick.

The reactions conducted in such reactors generally call for polymerization of the monomer or monomers in the gas phase. A catalyst is also introduced, and, as polymerization proceeds, small particles of polymer product are formed, which are suspended in the gas as a fluid bed.

The polymerization process is exothermic, and accordingly it is common continuously to recycle a large portion of the gas to extract energy, i.e. the heat of reaction, from the system so the process can be controlled. As the amount of heat generated is directly related to the amount of polymer produced, the efficiency of heat removal is a prime determinant of productivity and yield.

Moreover, if the temperature in the reactor becomes too high, the particles will soften or even melt, and tend to stick together. In addition there is commonly a risk of a triboelectric effects among the particles and especially between the particles and the wall. Static charges are difficult to control and may be generated for reasons not completely understood, but their presence appears to be related to the temperature of the wall, the temperature of the gas in the fluidized bed, and the dew point of the gas. When the temperature of the interior wall becomes too high relative to the dew point of the gas, static charges are more likely to be present, leading to excess coating formation on the wall and the undesirable phenomenon of sheeting.

Since large gas phase reactors are commonly outdoors and exposed to the elements, they have often been rained upon, but no one, to our knowledge, has attempted to adapt the operation of the reactor to accommodate the effect of rain on the internal temperature of the reactor. Attempts to control the wall temperature include the cooling tube disclosed in Japanese patent application 9-302008, and the cooling jacket described in Japanese patent applications 9-249703 and 7062009 A. All three of these disclosures speak of cooling the inner wall to a temperature below the dew point of the gas phase by cooling the outside of the reactor, but such methods require expensive cooling equipment and circulating apparatus. Negative factors in the use of various types of cooling jackets include the difficulty of sealing them, and the common presence of manways and instrumentation which could be covered by the jacket. A major safety factor is that a reactor leak may go undetected, underneath the jacket, so that explosive gases are concentrated in the cooling jacket or delivered with the used water to a drain basin or the like.

Wall cooling has been used in fluidized bed combustion systems—see U.S. Pat. Nos. 5,025,755 and 4,944,150.

U.S. Pat. No. 3,254,070 illustrates an early polymerization reactor equipped with a cooling jacket 56 for removing heat of reaction.

Canadian patent 709,470 shows a water jacket for cooling a gas phase polymerization process reactor, as a supplement to recycling unreacted monomer through a heat exchanger to reduce the temperature of the gas.

The reader may also be interested in Hussein U.S. Pat. No. 4,981,929 in which the dew point of the gas phase is controlled through the addition of a nonreactant gas recirculated with the unreacted monomer. The reaction temperature and the dew point are caused to approach one another either by such an addition to elevate the dew point or by lowering the temperature of the reaction. In the preferred mode, the polymerization is conducted at a temperature 0.1 to 5.0 degrees Centigrade above the dew point of the cycle gas in the reactor.

SUMMARY OF THE INVENTION

Our invention provides a method of cooling the outside wall of a gas phase olefin polymerization reactor to effect a reduction of temperature on the inside wall and/or in the gas immediately adjacent to the interior wall. The method includes bathing the reactor with a flow of water around its periphery, or substantially around it, to create a sheet or film of falling water in contact with the surface of the reactor. As will be apparent in the further explanation below, it is not necessary to know the temperature of the water used to form the sheet or film of falling water. Our invention recognizes the complexities of the relationship between the dew point of the reactant gas and the polymerization temperature, and accordingly the application of water to the outside of the reactor may be regulated concurrently with the condensing of recycle gas as described in Jenkins U.S. Pat. Nos. 4,543,399 and 4,588,790, and the adjustment of the dew point through addition of diluent as in the above cited U.S. Pat. No. 4,981,929, to Hussein et al. All three of these patents (U.S. Pat. Nos. 4,453,399, 4,588,790, and 4,981,929) are incorporated herein by reference. The conditions of the polymerization reaction and processes recited in these patents are all compatible with our invention.

The film of falling water may originate at various heights. It may be applied initially in the expanded section or at any point below the expanded section on the straight (sometimes called the cylindrical) section. While it is preferred that the falling film of water encircle the reactor in order to stabilize conditions in the fluidized bed, one may apply more water to one area than another, or even apply it only on one portion of the outer surface of the reactor, or application may be moved from one area to another as temperature readings from inside the reactor may indicate to be desirable. However, we prefer that the film of water be applied around the entire, or substantially the entire, periphery.

The sheet of falling water is preferably assured by using sprays originating around the periphery of the reactor and directed at the reactor wall.

The application of water to the outer surface of the reactor may be intermittent or continuous. The water may be applied in response to electrostatic phenomena measured inside the reactor as a harbinger of possible sheet formation. The water may be applied in response to temperature readings from inside the reactor, particularly temperature readings at or close to the inner surface of the reactor wall, preferably 1/16 inch to 1/2 inch from the inner surface of the wall The application of water to the outer surface of the reactor may be in conjunction with condensing of the reactor recycle gas as described in Jenkins U.S. Pat. No. 4,543,399 and in U.S. Pat. No. 4,588,790, (incorporated by reference elsewhere herein) as well as in U.S. Pat. No. 5,804,677, 4,981,929 (also incorporated by reference because of its description of the introduction of nonreactant liquid to the recycle fluid), U.S. Pat. Nos. 4,933,148, 5,352,749, 5,405, 922, 5,436,304, 5,453,471, 5,834,571, and 5,804,677. In a preferred embodiment, the dewpoint of the cycle gas is within about 15 degrees Centigrade of the reaction temperature, more preferably within about 10 degrees of the reaction temperature during condensing operation. In this mode, gases may condense along the internal surface of the reactor, and liquid is more easily distributed to the internal surface from the condensed cycle gas circulating around the reactor loop. Such condensed liquid, (comprising, for example, from about 2% to about 50% or more, or perhaps more common in present commercial practice, about 10% to about 20% by weight of the recycle fluid, introduced in a known manner through the distributor plate, may penetrate to a greater height into the bed, particularly along the inner reactor walls. In another embodiment the condensed liquid circulating around the cycle gas loop may be injected nonuniformly at the bottom of the reactor, such that more of the liquid enters the fluidized bed within about 0.1 to about 3 feet or even four feet from the internal surface of the reactor wall than in the radial middle of the fluid bed; this during the application of water to the external surface of the reactor. The liquid may be introduced with the gas or separately in accordance with the teachings of U.S. Pat. Nos. 4,454,399 and 5,804,677. In yet another embodiment, the condensed liquid circulating around the cycle gas loop may be injected alone or with additional gas onto the vertical internal surface of the reactor well into the resin bed during the application of water to the external surface. The condensed liquid and/or gas may be injected at a height of about 1% to 100% of the bed (or reaction zone) height. All or part (for example, at least 10%) of the condensed liquid may be injected at or near the wall—that is, released within a distance of about six inches from the wall. It may be injected using for example a series of nozzles, pipes, or conduits that extend radially around the inside of the reactor. Alternately, the condensed liquid may be sprayed on the top of the bed as water is applied to the external surface of the reactor. The condensed liquid may also be introduced along the perimeter of the internal reactor wall above the fluid bed in the freeboard or into the expanded section. This may be accomplished using, for example, a series of nozzles, pipes, slits or conduits that extend radially around the reactor. Water may be sprayed on the outside of the reactor at the same height or above or below where the condensed liquid is added inside the reactor.

DETAILED DESCRIPTION OF THE INVENTION

Figure 1:
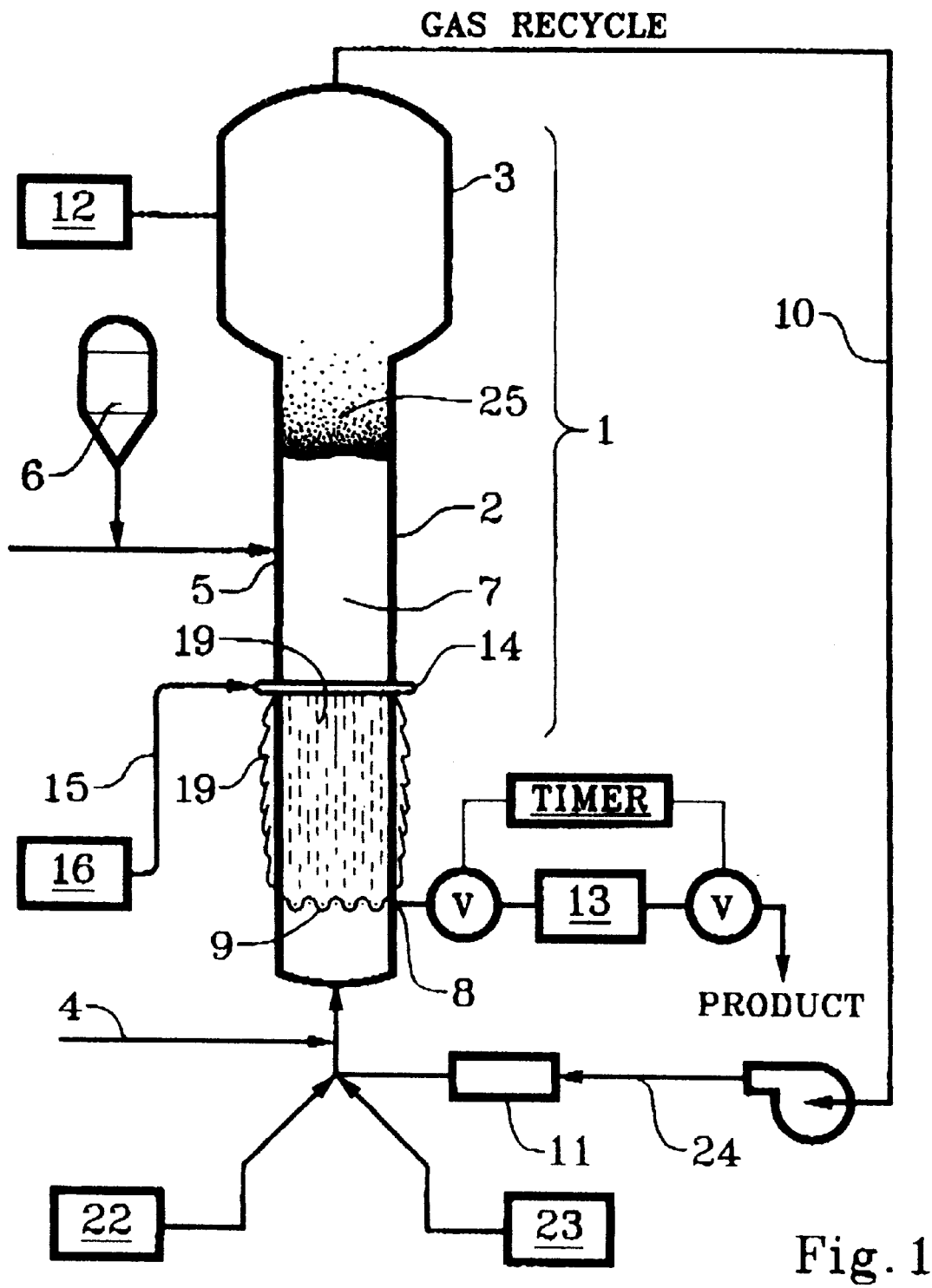
FIG. 1 illustrates a typical prior art polyolefin gas phase reactor, to which has been added a pipe ring or manifold having a plurality of nozzles directed toward the reactor.

In FIG. 1, reactor 1 is a standard "Unipol" reactor, a type commonly used for making polyethylene, ethylene copolymers, and other olefin polymers. The reactor 1 includes straight section 2, which typically extends 50 feet above distribution plate 9, and expanded section 3. As is known in the art, the raw material monomer is continuously introduced in the gas phase near the bottom of the bed, shown schematically as line 4, and an appropriate catalyst from source 6 is introduced into the fluid bed at a point 5. Cocatalyst and other additives may be introduced from sources 22 and 23. Particles of polymer 25 are formed by the action of the catalyst on the monomer, suspended in reaction zone 7, and withdrawn as product at a take-off point 8 usually near distributor plate 9. Gas is continuously recycled through line 10 to a heat exchanger 11, where it is cooled and/or condensed to remove the heat of reaction. In an alternate scheme not shown, gaseous feed monomer may be introduced to line 10 and makeup liquid in line 24; line 4 would not be used. Our invention may be used with other variations known to the art for conducting the polymerization process in a fluid bed reactor.

Introduction of a nonreactant gas such as propane, butane, isobutane, pentane, isopentane, hexane, heptane, octane (saturated hydrocarbons having 3–8 carbons), or mixtures thereof into the system will help to control the dew point of the gas phase in the reactor. See U.S. Pat. No. 4,981,929 discussed above. Make-up gas, which generally consists of the monomer, nitrogen, and hydrogen, but may contain isopentane, propane, or other nonreactant gas, is fed to the bed at a rate to keep a steady state gaseous composition. The composition of the make-up gas is determined by a gas analyzer 12 positioned above the bed. The gas analyzer determines the composition of the gas being recycled and the composition of the make up gas is adjusted accordingly to maintain an essentially steady state gaseous composition within the reaction zone 7. The dew point may also be calculated by the gas analyzer (or a separate analyzer) in a known manner.

The polymer production rate of the bed is controlled by the rate of injection of the catalyst components. The productivity of the bed may be increased by simply increasing the rate of injection of the components and decreased by reducing the rate of injection.

Since any change in the rate of injection of the catalyst components will change the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Removal of particulate product through take-off point 8 is preferably controlled by a pair of timed valves which establish a separation zone 13 as is known in the art Unused monomer gas may be removed in separation zone 13 and reinjected at a point not shown in the recycle line 10. Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

To the more or less conventional reactor 1 has been added a pipe ring 14, and on the pipe ring 14 is a plurality of nozzles 18 (see FIG. 2) forming sprays 17 directed toward the exterior of the reactor wall. Pipe ring 14 is in turn connected through line 15 to a source 16 of cooling water.

Immediately below the sprays 17 and on the wall of reactor 1 a sheet or film 19 of water is seen to form. This water film 19 is of a thickness or intensity which is normally and preferably substantially uniform around the periphery of the straight section 2 of the reactor at the level of pipe ring 14. The initial flow is preferably of a substantially even rate around the periphery of the reactor. The flow of water to the pipe ring 14 and nozzles 18 may be regulated either manually or automatically.

Figure 2:
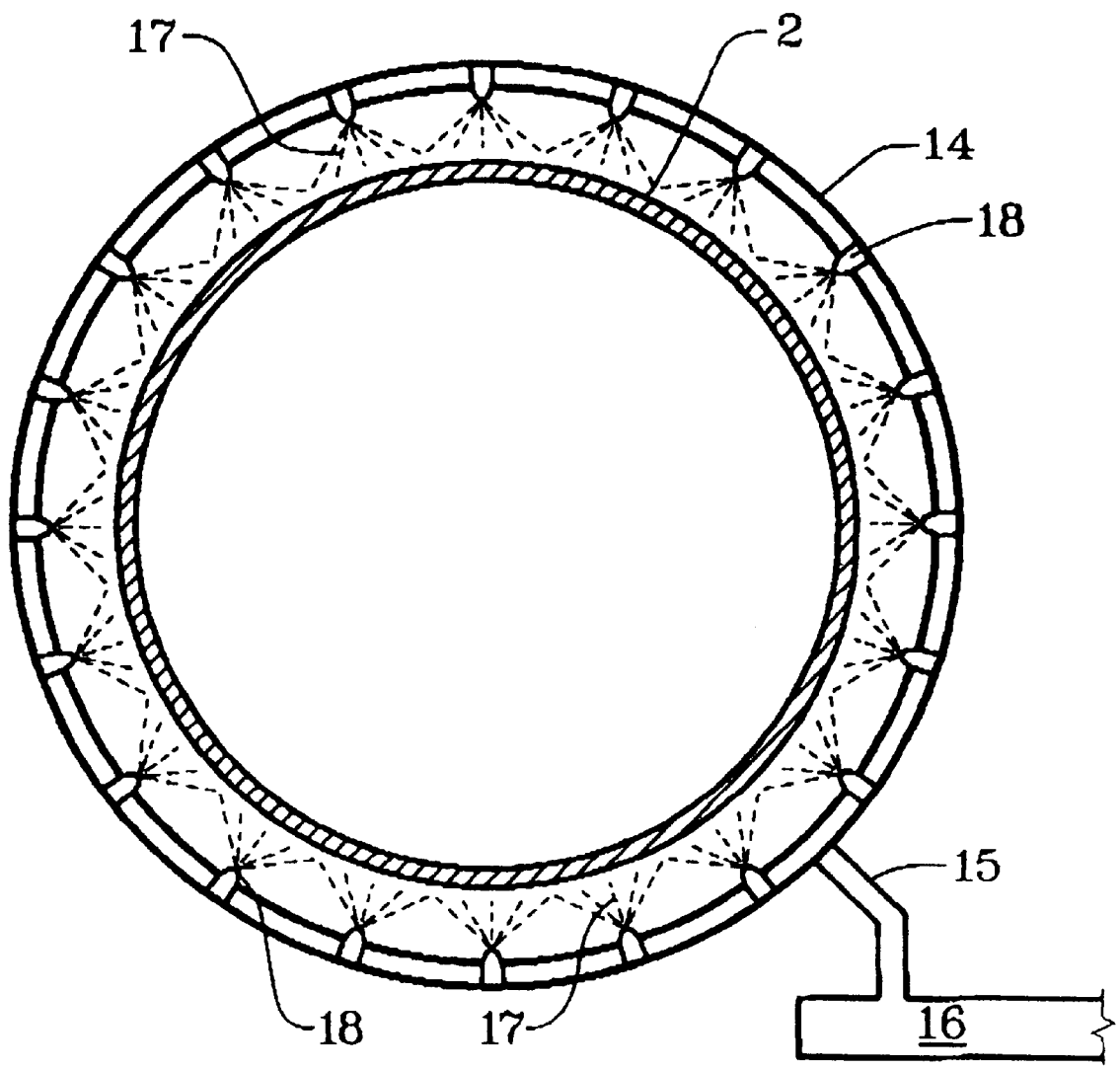
FIG. 2 is an overhead sectional view of the reactor and spray deployment.

Referring now to FIG. 2, the drawing shows an overhead view of a section of straight section 2, the distributor plate 9 and other parts in the interior of the reactor 1 being omitted. Straight section 2 is surrounded by pipe ring 14, in this case bearing twenty nozzles 18, each of which directs a water spray 17 toward straight section 2 Water is supplied from source 16 through line 15. The sprays 17 preferably contact each other so as to coat the complete periphery of the straight section 2 and form a continuous circumferential falling film as seen in FIG. 1.

Figure 3:
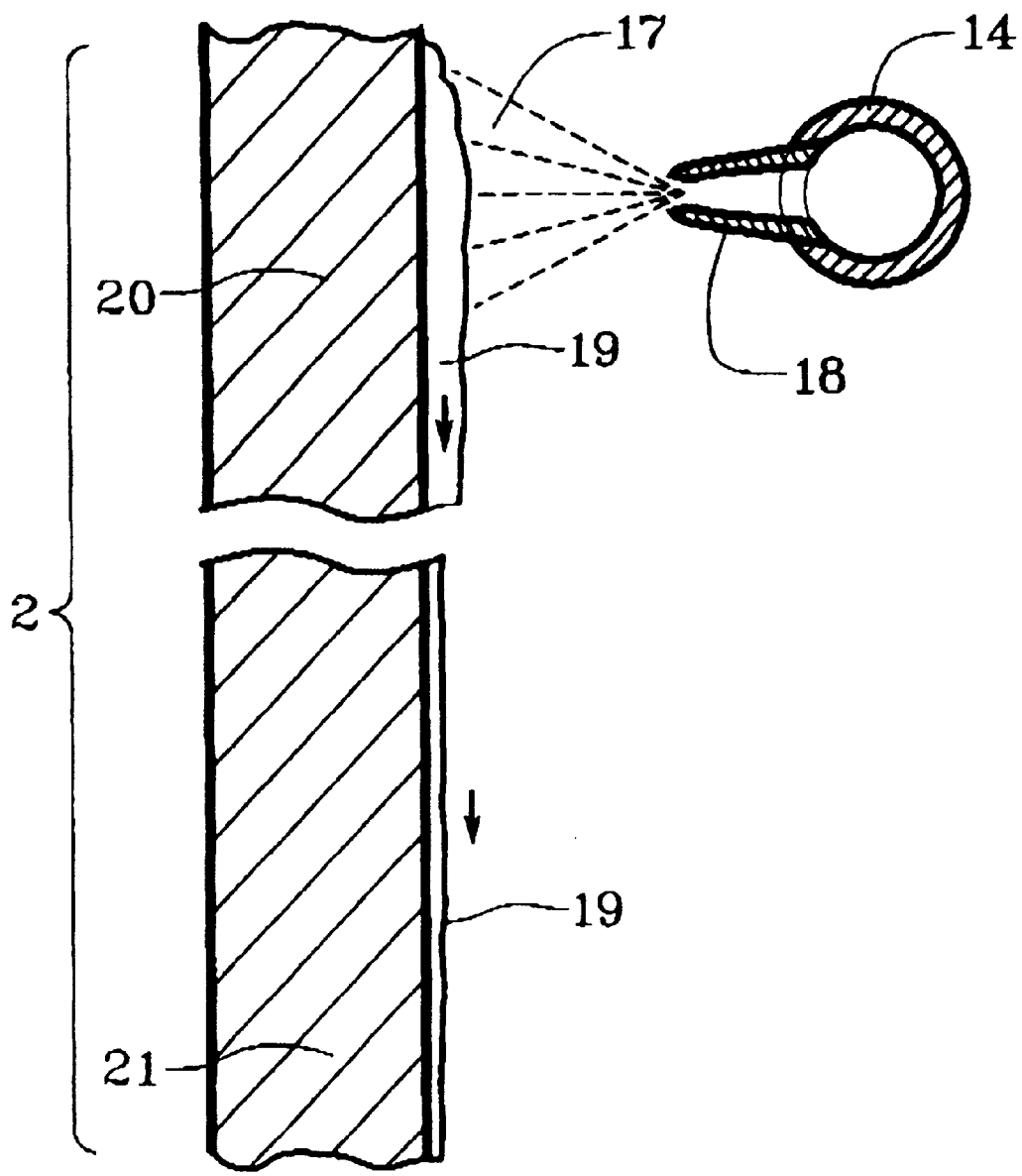
FIG. 3 is a vertical section of the reactor wall showing the shapes of the upper and lower regions of the falling film.

In FIG. 3, the disposition and action of the falling water film 19 has been exaggerated to illustrate an important effect in our invention. The water spray 17 ejected from pipe ring 14 through nozzle 18 strikes the reactor straight section 2 and initially forms a relatively thick and somewhat turbulent accumulation of water in upper region 20. While the innermost water tends to cling to the straight section 2, the outermost water is not so retarded. Both the innermost and outermost accelerate briefly as they flow downwardly, but by the time the film reaches a lower region 21 of straight section 2, it is somewhat thinner but does not continue to accelerate, as the surface effects on contact with the reactor surface predominate over the effect of gravitational pull. The film 19 on lower region 21 is of a slightly higher temperature than when it first strikes the reactor in the form of a spray, having absorbed heat energy from straight section 2 during its downward fall; it nevertheless is almost as efficient in removing heat from lower region 21 as is upper region 20. Thus, while the greatest rate of cooling may take place near sprays 17 and in region 20, it should not be assumed that there is little cooling effect in the lower regions, even for falling films which originate as high as the expanded section 3. Certain experiments have been conducted to develop the invention.

EXPERIMENT 1

It was noticed that electrical charges due to static electric phenomona in an operating commercial reactor were reduced during heavy rainstorms, and it was speculated that the reduction in static electric charge was correlated with a reduction in temperature of the reactor wall. Directing a fire monitor—a nozzle on a swivel—on the reactor with supplemental pumping provided a dramatic decrease in static.

EXPERIMENT 2

Two fifteen-minute tests were conducted in a pilot plant. In the first, the fluid bed had a temperature of 83° C. and a dewpoint of 74° C. Prostatic agents were added to the polymerization system to generate static electricity in the system, static electricity was in fact generated, and when water was applied to the expanded section and straight section and permitted to flow downward in a sheet or film, the static electricity dropped to zero.

In the second test, the bed was at 88° C. and the dewpoint at 60° C.; accordingly the high bed temperature induced static electricity without the necessity of introducing prostatic agents to generate it. The static was cut from 650 volts to 250 volts by the application of water to the expanded section, allowing it to drain downward in a film-like sheet around the base of the expanded section and on down the entire length of the straight section.

It was observed that the bed temperature decreased significantly in both cases, and in each case the static returned roughly to its previous level shortly after the application of water was ceased.

EXPERIMENT 3

A pipe ring similar to pipe ring 10 in FIG. 1 was constructed around a commercial reactor on the straight section (similar to straight section 2 in FIG. 1) about ten feet above the plate (similar to distributor plate 9 in FIG. 1). The pipe ring completely encircled the reactor on the straight section, which had a diameter of about 14.5 feet. The pipe ring utilized pipe of four inches in diameter and had 17 nozzles spaced evenly around its full circumference. Firewater was pumped into the pipe ring at flow rates described below. When the spraying was begun, the bed temperature was 84° C., the dew point was 65° C., and the static was in a band of −100v to +500v. Skin thermocouples (thermocouples inserted into the reactor and extending about $\frac{1}{16}$ inch to about $\frac{3}{8}$ inch from the inside surface of the wall into the fluid bed) had demonstrated spikes about 5–7° C. above the bed temperature prior to pumping the water.

In a first variation, pumping of water was begun at an initial rate of 300 gallons per minute, whereupon the static dropped rapidly to a band between −50 volts and 0 volts, the internal wall temperature dropped to about 45° C., the skin thermocouples dropped about 4 to about 8° C. to a new baseline, and also began spiking to as low as 60° C. After pumping was terminated, the skin thermocouples returned to the initial baseline, and resumed positive excursions. This experience was repeated over several cycles.

In a second variation, it was desired to determine whether an optimal level of wall cooling could be achieved. Accordingly, the water pumping rate was reduced in steps of 100 gpm beginning at 300, i.e. 300 gpm, 200 gpm, 100 gpm and zero. It was observed that the static band width increased slightly with each step down, and the negative thermocouple excursions continued down to 60–65° C. It was also observed that at 100 gpm, the water film ceased to be continuous—that is, it separated into discrete portions or streams. Water flow rate was then increased directly to 600 gallons per minute. Static showed little improvement over 300 gpm, and negative thermocouple excursions continued.

It was concluded that the application of water reduced static in the region of water contact, and caused sharp decreases in temperature near the interior wall. Rubble and sheeting formation was minimal.

Our invention is useful in all types of gas phase, fluid bed reactors for olefin polymerization—that is, we are not limited to the particular methods of monomer feed and recycle described herein; we may use any type of catalyst.

In a preferred mode of our invention, where the reactor has a diameter of 14.5 feet, the water spray is applied at ar rate of 200 to 600 gallons per minute to the periphery of the straight section at a height, preferably of at least three feet, and most preferably at least ten feet, above the plate. Thus, in this preferred mode, the spray is applied so that each foot of the circumference of the straight section receives about 6.6 gallons of water per minute at a height of at least ten feet. Generally, a quick response to an undesired high temperature will mean the application of about 4.4 to about 13.2 gallons of water per foot of circumference of the straight section at a height of at least 3 feet above the distribution plate. Thus our preferred process for a commercial reactor having a diameter of 8 to about 20 feet involves applying a falling film of water, beginning at least 3 feet above the distributor plate, at a rate of 4.4 to 13.2 gallons per minute per foot of reactor circumference.

There is a large variety of nozzles available in commerce, and we may use any of them, but we particularly prefer those which are able to bring about a smooth-flowing film or sheet of water from a point immediately below the application of the spray. Certain spray nozzles are designed to provide particular patterns of spray, to generate large drops, jets, or fine atomized drops. The fine atomized drops may be gas-assisted—that is, they are broken into small droplets by the introduction of air or other gas in the nozzle and achieve a high degree of efficiency of heat removal. If a further reduction in the amount of water used is desired, the gas and/or the water may be cooled before application to the reactor; of course the water may be cooled when it is used without atomization or gas assist, and this may be particularly desirable where it is recirculated, since otherwise it may increase in temperature through reuse.

A falling film of water within our invention may be formed by a pipe ring much closer to the reactor shown in FIG. 2, having a large number of simple holes directed toward the reactor, thus forming a film without the use of sprays, such as by simply applying the flowing water directly to the reactor surface rather than forming a separate stream or jet through the air. A weir or similar device may also be used to form a simple flow of water. While we prefer sprays, any method of forming a falling film is satisfactory.

While flow rates of 300 gallons per minute of water, and up to 600 gallons per minute, are discussed above, it should be understood that these amounts and rates are discussed in the context of a reactor of a shape similar to that of FIG. 1 wherein the diameter of straight section 1 is about 14.5 feet and its height is about 50 feet, with additional volume in the expanded section. In addition to the geometry and dimensions of the reactor, the rate of reaction should also be taken into account, as it of course has a direct bearing on generation of the heat of reaction. Our invention contemplates maintaining the temperature near the inside of the reactor wall at a temperature at a point which is in a desired relation to the dew point of the gas; accordingly, the most direct method of assuring that temperature difference is to monitor the dew point and conduct the cooling to maintain a monitored temperature inside the reactor wall at a desired difference from the dew point. Most often, it will be desired to maintain the temperature near the wall to be below the dew point—for example, as much as 24 degrees Centigrade below the dew point—however, there may also be occasions and conditions in which it is desired to maintain a temperature above the dew point, which may be monitored in the expanded section, the recycle line, or near the reactor wall. Further, as mentioned above with reference to U.S. Pat. No. 4,981,929, the application of water to the outside of the reactor may be coordinated with the use of a nonreactant in the recycle gas to control the dew point of the recycle gas. The dew point may be modulated by varying the introduction of nonreactant liquid to the recycle fluid. In any case, it is clear that our invention will reduce the incidence of static charge and attendant sheeting, as shown in the experiments above.

It is to be understood that our invention is not intended to be used when there is no need for it—that is, control systems may be installed, for example, to operate the system only when the difference between the inside wall temperature and the dew point of the gas is outside of a predetermined range. Thus, the application of water may be intermittent. The temperature near the inside of the reactor wall may be monitored in any known manner; generally it is done with a thermocouple positioned at the desired spot. We have found that the temperature responds rather quickly to the application of a film of water to the outside of the reactor.

Our invention reduces the number of shutdowns of the reactor by assuring avoiding conditions known to cause sheeting and other formations of undesirably large masses of product. In addition, it permits more efficient operation by providing more control over the relationship between dew-point and reaction temperature.

What is claimed is:

1. Method of modifying temperature near an interior wall of a fluid bed polymerization reactor having a straight section, an expanded section, a wall having interior and exterior surfaces, a fluid recycle system, and a distributor plate, comprising applying a water spray around the periphery of said exterior surface of said wall of said reactor to cause the formation of a falling film of water thereon to reduce the temperature in said reactor near said interior surface of said wall.

2. Method of claim 1 wherein said water spray is applied to said exterior surface of said wall at a height of at least three feet above said distributor plate.

3. Method of claim 1 wherein said water spray is applied from nozzles mounted on a pipe ring surrounding said reactor.

4. Method of claim 1 wherein said water spray is applied on the straight section of said reactor.

5. Method of claim 1 wherein said water spray is applied on the expanded section of said reactor.

6. Method of claim 1 wherein said straight section of said reactor has a diameter of about 8 feet to about 20 feet and said water spray is applied to said straight section at a rate of about 4.4 to about 13.2 gallons per minute per circumferential foot around its periphery at a height of at least three feet from the distributor plate.

7. Method of claim 1 wherein said reduction in temperature is coordinated with a desired relationship of said temperature near said internal wall to the dew point of gas in said fluid recycle system.

8. Method of claim 1 wherein said spray is mixed with gas and atomized.

9. Method of claim 8 wherein said gas has a temperature lower than said water.

10. Method of claim 1 wherein said water spray is applied to said exterior surface of said wall to encircle said reactor.

11. Method of claim 1 wherein said water spray is applied to a portion of said exterior surface of said wall.

12. Method of claim 1 wherein said water spray is applied in a higher amount to a portion of said exterior surface of said wall.

13. Method of claim 1 wherein said water spray is applied intermittently.

14. Method of claim 1 wherein said water spray is applied continuously.

15. Apparatus for conducting a polymerization reaction comprising a gas phase, fluid bed reactor having a straight section, an expanded section, a distributor plate, means for introducing monomer to be polymerized and catalyst for catalyzing said reaction, and means for recycling and cooling gas therein, said fluid bed reactor including means for forming a falling film of water on the outside of said reactor.

16. Apparatus of claim 15 wherein said means for forming a falling film of water comprise a pipe ring having a plurality of spray nozzles directed at said reactor.

17. Apparatus of claim 16 wherein said pipe ring is located at least three feet above said distributor plate.

18. Method of claim 15 wherein said film is formed at a point at least ten feet high on said reactor.

19. Method of modifying temperature near the inside wall surface of a fluid bed polyolefin reactor which recycles gas for cooling comprising (a) monitoring temperature near said inside wall surface and (b) forming a falling film of water on the outside of said wall substantially around its periphery when said temperature is higher than desired.

20. Method of modifying temperature near the inside wall surface of a fluid bed polyolefin reactor which recycles gas for cooling comprising (a) monitoring temperature near said inside wall surface and (b) forming a falling film of water on the outside of said wall around its periphery when said temperature is higher than desired.

21. Method of claim 20 wherein said water is formed on the outside of said wall to encircle said reactor.

22. Method of claim 20 wherein said water is formed on a portion of the outside of said wall.

23. Method of operating a fluid bed olefin polymerization process in a reactor having a wall with outside and inside surfaces, said wall defining a reaction zone, said reactor also having a distributor plate near the bottom of said reaction zone, comprising (a) continuously recycling gas from said reactor to cool and condense said gas, thereby forming a recycle fluid comprising about 2% to about 50% by weight liquid, (b) continuously injecting said recycle fluid into said reactor, and (c) at least intermittently cooling said outside wall surface of said reactor by forming a falling film of water thereon around its periphery.

24. Method of claim 23 wherein substantially all of said liquid in said recycle fluid is injected into the reactor onto or near said inside surface of said reactor.

25. Method of claim 20 wherein said falling film is formed at a height on said outside wall surface at least three feet above said distributor plate.

26. Method of claim 20 wherein said falling film is formed at a height of at least ten feet above said distributor plate.

27. Method of claim 20 wherein said recycle fluid comprises about 10% to about 20% liquid.

28. Method of claim 23 wherein said falling film is formed at a height on said outside wall surface at least three feet above said distributor plate.

29. Method of claim 23 wherein said falling film is formed at a height of at least ten feet above said distributor plate.

30. Method of claim 23 wherein said falling film is formed on said outside wall surface to encircle said reactor.

31. Method of claim 23 wherein said falling film is formed on a portion of said outside wall surface.

32. Method of claim 23 wherein said recycle fluid comprises about 10% to about 20% liquid.

* * * * *

UNITED STATES PATENT AND TRADEMARK OFFICE
CERTIFICATE OF CORRECTION

PATENT NO.    : 6,300,429 B1                                               Page 1 of 1
DATED         : October 9, 2001
INVENTOR(S)   : Thomas Edward Spriggs et al.

It is certified that error appears in the above-identified patent and that said Letters Patent is hereby corrected as shown below:

<u>Column 8,</u>
Lines 61-65, delete and replace it with -- 15. Method of controlling the temperature of a fluid bed gas phase olefin polymerization reactor comprising (a) monitoring the dew point of said gas phase (b) monitoring the temperature at a point near the inside wall of said reactor, and (c) modifying the temperature at said point to maintain a predetermined difference from said dew point by forming a film of falling water on the outside of said reactor. --

<u>Column 9,</u>
Lines 1-3, delete and replace it with -- 16. Method of claim 15 wherein said film of falling water is formed by spraying the outside wall of said reactor with water. --
Lines 4-5, delete and replace it with -- 17. Method of claim 15 wherein said temperature is maintained between said dew point and 24 degrees Centigrade below said dew point. --
Lines 8-13, delete and replace it with -- 19. Method of claim 15 wherein said dew point is modulated by varying the introduction of a nonreactant to said reactor. --

<u>Column 10,</u>
Lines 8-10, delete and replace it with -- 25. Method of claim 23 wherein said gas recycled in step (a) includes a nonreactant gas. --
Lines 11-13, delete and replace it with -- 26. Method of claim 23 wherein, in step (b), at least some of the liquid in said recycle fluid is introduced onto or near said inside surface of said wall of said reactor. --

<u>Column 10,</u>
Lines 14-15, delete and replace it with -- 27. Method of claim 25 wherein at least 10% of said liquid is introduced onto or near said inside surface of said wall of said reactor. --

Signed and Sealed this

Twenty-second Day of October, 2002

*Attest:*

*Attesting Officer*

JAMES E. ROGAN
*Director of the United States Patent and Trademark Office*